(12) United States Patent
DeFazio et al.

(10) Patent No.: US 10,248,781 B2
(45) Date of Patent: Apr. 2, 2019

(54) METHOD OF PASSCODE UNLOCK USING FORCE DETECTION

(71) Applicant: BlackBerry Limited, Waterloo (CA)

(72) Inventors: Michael Joseph DeFazio, Fonthill (CA); Ryan Gerard Ebbers, Newmarket (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/155,142

(22) Filed: May 16, 2016

(65) Prior Publication Data
US 2017/0329953 A1 Nov. 16, 2017

(51) Int. Cl.
*G06F 7/04* (2006.01)
*G06F 21/36* (2013.01)
*G06F 3/0488* (2013.01)
*G06F 3/01* (2006.01)

(52) U.S. Cl.
CPC .............. *G06F 21/36* (2013.01); *G06F 3/016* (2013.01); *G06F 3/0488* (2013.01)

(58) Field of Classification Search
CPC ......... G06F 21/36; G06F 3/016; G06F 3/0488
See application file for complete search history.

(56) References Cited

U.S. PATENT DOCUMENTS

| | | |
|---|---|---|
| 6,483,051 B2 | 11/2002 | Maatta et al. |
| 7,592,999 B2 | 9/2009 | Rosenberg et al. |
| 8,253,052 B2 | 8/2012 | Chen |
| 8,629,790 B2 | 1/2014 | Oh |
| 8,674,961 B2 | 3/2014 | Posamentier |
| 8,690,576 B2 | 4/2014 | Murphy et al. |
| 2008/0235788 A1 | 9/2008 | El Saddik et al. |
| 2009/0006991 A1* | 1/2009 | Lindberg ............ G06F 3/04817 715/763 |
| 2010/0027854 A1* | 2/2010 | Chatterjee ............... G06F 3/016 382/124 |

(Continued)

OTHER PUBLICATIONS

Denis Foo Kune et al. "Timing Attacks on PIN Input Devices," CCS'10, Oct. 4-8, 2010, pp. 678-680.*

(Continued)

*Primary Examiner* — Luu Pham
*Assistant Examiner* — Canh Le
(74) *Attorney, Agent, or Firm* — Jose Gutman; Fleit Gibbons Gutman Bongini & Bianco P.L.

(57) ABSTRACT

A system and method unlock a passcode-secured device using force detection and haptic feedback. When prompted for a passcode, a user applies a press and hold gesture, applying continuous pressure force, to a surface of the device while receiving tactile feedback at the surface in the form of vibratory pulses. The vibratory pulses continue until the pressure force is released from the surface. The user counts the number of pulses sensed by tactile feedback at the surface until the desired number is obtained, then releases the pressure force from the surface, signaling that the pulse count should be entered as a passcode digit value. The process is repeated for each sequential passcode digit until a passcode is entered in the device. The device unlocks if the entered passcode matches a reference passcode in the device.

16 Claims, 11 Drawing Sheets

(56) References Cited

U.S. PATENT DOCUMENTS

| | | | |
|---|---|---|---|
| 2010/0045608 A1* | 2/2010 | Lessing | G06F 3/04883 345/173 |
| 2010/0220065 A1 | 9/2010 | Ma | |
| 2010/0225607 A1* | 9/2010 | Kim | G06F 3/042 345/173 |
| 2012/0126941 A1* | 5/2012 | Coggill | G06F 21/36 340/5.54 |
| 2013/0194223 A1* | 8/2013 | Ward | G06F 1/3262 345/174 |
| 2013/0318437 A1* | 11/2013 | Jung | G06F 3/0488 715/251 |
| 2014/0118267 A1 | 5/2014 | Thomas | |
| 2014/0230575 A1 | 8/2014 | Picciotto et al. | |
| 2014/0362013 A1 | 12/2014 | Nikoozadeh et al. | |
| 2015/0347728 A1 | 12/2015 | Holyoake | |
| 2017/0094636 A1* | 3/2017 | Fadell | H04W 68/005 |

OTHER PUBLICATIONS

Edward Jung & C-C Hung et al., "An Efficient Locking and Unlocking Method of Sequential Systems," RACS'12, Oct. 23-26, 2012, pp. 428-433.*

European Search Report for European Patent Application No. 17170246.7 dated Jun. 26, 2017.

* cited by examiner

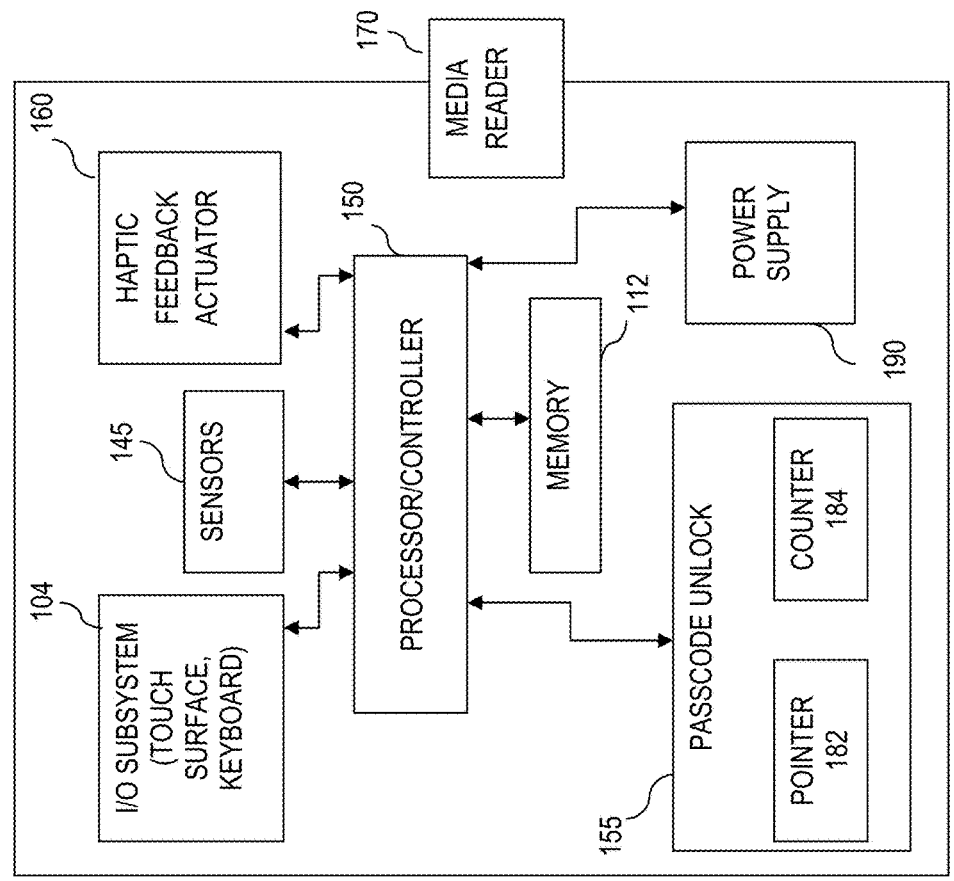
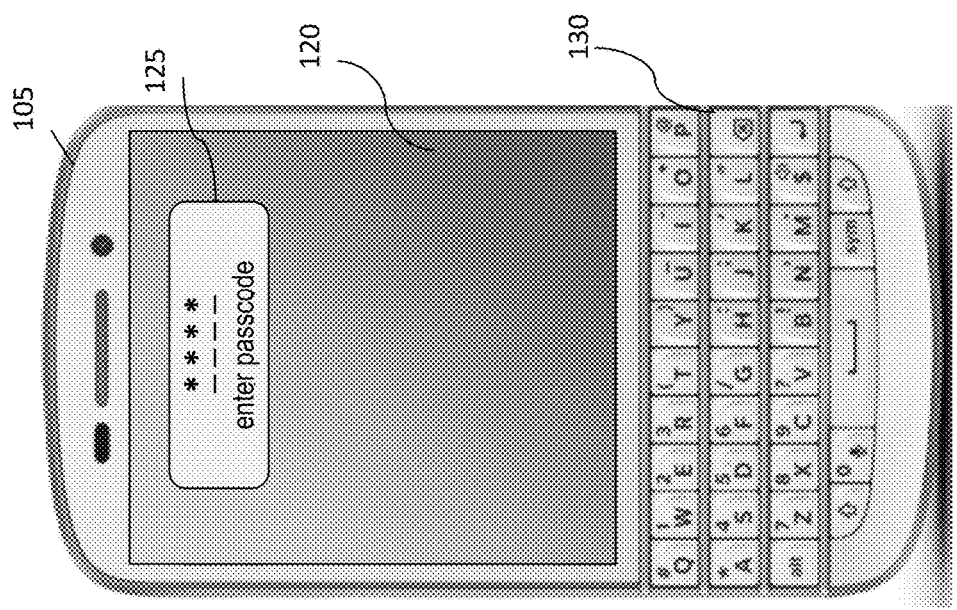
FIG. 1B
FIG. 1A

US 10,248,781 B2

METHOD OF PASSCODE UNLOCK USING FORCE DETECTION

FIELD OF THE DISCLOSURE

The present disclosure generally relates to device access security, and more particularly to passcode unlock of access to a user interface of an electronic device.

BACKGROUND

In the realm of password authentication, the more difficult a password is to remember and input, the more secure it is.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 1A is an illustration of a passcode-secured device, according to an example;

FIG. 1B is a high-level block diagram of components of the passcode-secured device of FIG. 1A, according to the example;

DETAILED DESCRIPTION

Figure 2:
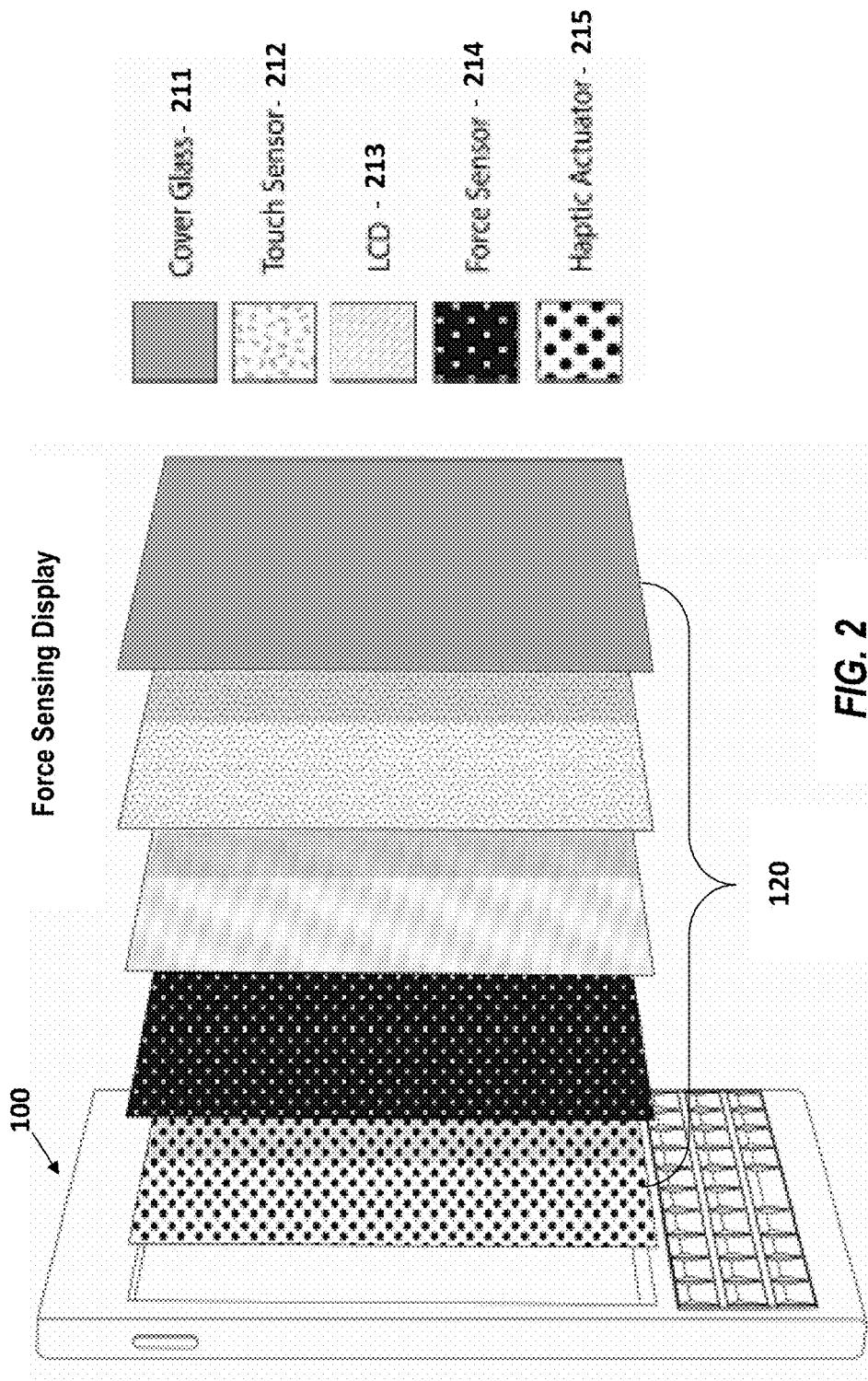
FIG. 2 illustrates component layers of a force sensing display and user interface, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Passcodes are used to unlock access to a passcode-secured system and/or to gain access to secured features of a system. A passcode-secured system is any system which can be unlocked by entry of a passcode. Some examples of passcode-secured systems include, without limitation, computing devices such as electronic devices, unmanned terminals such as ATMs (automated teller machines), and passcode-enabled door locks. Short passcodes, such as a PIN (password identification number), reduce the cognitive burden; they are easy to remember and easy to input. This is why three or four-digit PINs are widely used at ATMs and as burglar alarm codes.

Passcodes, passwords, PINs, and passphrases are all character strings used for authentication and access. Generally, people use the term "PIN" to designate a three or four-digit numeric string and refer to a password as a longer character string containing letters. However, for the purposes of this discussion, we treat passcodes, PINs, and passwords as interchangeable and use the general term "passcode" for brevity.

Passcode-secured systems rely on an authentication system to guard access. Typically, authentication systems require that a user enter, typically via a user interface, a passcode in order to gain access to the secured system. Some systems require a user to re-enter the passcode after a certain amount of time has elapsed. In its most basic operation, an authentication system stores a passcode that is either set by the user, a manufacturer, or other entity. A passcode may comprise a character string that can include letters, numbers and special characters. For example, a passcode can range from a simple string of numbers, such as "123", to more complex strings, such as "!A45qTvm4#." The authentication system is responsible for maintaining the passcode-secured system in a locked state until the correct passcode is entered and, for example, compared with a stored passcode. If the two passcodes match, e.g., are identical, the authentication system unlocks the passcode-secured system.

One problem with using passcodes on keypads is that the frequent and repeated use of a passcode leaves a trace on the keypad. An intruder can discern the passcode by studying the trace. Frequent use of certain keys will establish a wear pattern on the pertinent keys that is not found on other keys that are infrequently used. This indicates that the "worn" keys are the passcode keys. An intruder would only need to try different combinations of those "worn" keys until entry is enabled.

A short password can be glimpsed by an intruder, sometimes referred to as shoulder surfing; perhaps someone standing next to the user can observe the user inputting the password and infer the password based on the user's movement over the keypad. This is why ATMs generally present instructions to cover the keypad when inputting the PIN.

Simple easy-to-use passwords such as four digit PINs (password identification numbers) reduce the complexity but are not preferred from a security standpoint as they are relatively more susceptible to being guessed or seen and compromised during input. Relaxing security to favor ease of use is a tradeoff that can have serious consequences.

A Non-Visual Passcode System

To address these and other shortcomings, a non-visual method of passcode or password unlock employs force detection along with haptic feedback to effectively allow a user to enter a simple passcode or password blindly. The non-visual methods described herein allow a user to enter a passcode to unlock a device without needing to view the device. In the case of a mobile device, for example, the user would not even need to remove the device from a pocket or purse to enter the passcode. This solution can be implemented on any touch input surface such as, but not limited to, a touch screen display or a physical keyboard. An advantageous benefit of the non-visual method of password input is that it reduces security concerns associated with entering simple PINs, allowing enterprise (IT-managed) accounts to relax a requirement for complex passwords.

Entry of the passcode fields (e.g., each passcode character being a passcode field) in this manner can be done quickly and surreptitiously because, according to one example, the user is not seen by anyone else as entering passcode characters. Instead, a user can simply press and release a keyboard, or one or more keys, in response to contemporaneous tactile sensations (also referred to as tactile signals or haptic effect) that are imperceptible (and invisible) to anyone else but are perceptible to the user by touch sensation of the user. The occurrence of press and release gestures, monitored relative to the contemporaneous generation of the tactile signals, are then converted to sequential numbers (e.g., passcode numeric characters) entered into passcode fields by the device. To an observer, the user has done nothing but touch the device.

According to various implementations of a method, the non-visual passcode entry operates in the following manner—when prompted for a passcode, a user simply applies pressure onto an area of the touch surface or keyboard of the passcode-secured device. As the user presses down on an outer surface of the device in a press and hold gesture (i.e., a long press), a haptic effect (tactile signal) is applied to the surface. The user feels tactile feedback in the form of vibratory pulses. These pulses can accelerate or decelerate in response to the amount of force being applied by the user on the surface, allowing a user to input passcode fields slowly or very quickly if desired. The force sensors monitoring the surface of the device are calibrated so that simply lightly resting one's finger on the surface will invoke no tactile feedback. During the entire input process, according to various implementations, the user need not move his/her finger over a keyboard so anyone watching has no indication of what, if anything, is being entered.

For example, assume a four-digit passcode is set to "2839." To unlock the passcode-secured device with this passcode, the user presses and holds for two pulses, then releases; presses and holds for eight pulses (applying slightly more force than before to get to eight pulses faster), then releases; presses and holds for three pulses, then releases; presses and holds for nine pulses (applying more force for speed), then releases. The user has just inputted a secure passcode that cannot be discerned even by someone looking directly at the surface of the device.

The below described systems and methods are directed to an example of a non-visual passcode-secured system.

FIGS. 1A and 1B—Passcode-Secured System

FIG. 1A is an illustration of an electronic device and FIG. 1B is a simplified block diagram of associated components of the electronic device in which the example systems and methods disclosed herein may be implemented. Referring now to FIG. 1A a passcode-secured system is represented as an electronic device 100, according to an example. The electronic device 100 in some implementations can be an electronic device such as the device of FIG. 1A, a computer, mobile device, tablet, laptop, notebook, vehicle, smartphone, gaming device, camera, television device, accessory device, peripheral device, portable media player, health/medical/fitness device, smartwatch, headset or other wearable device, or any other electronic device. In the illustrated example, the electronic device 100 is a mobile device such as a smartphone and features a touch surface 120 and an optional hardware keyboard 130.

Referring to FIG. 1B, device 100 also includes components such as one or more input devices interconnected with processor 150 and a power supply subsystem 190. Input devices are part of the Input/Output subsystem 104 and can include, for example, optional hardware keyboard 130 and a touch surface 120. Memory 112 is interconnected with processor 150 and stores data and instructions. In general, the device 100 includes other components to support its operations. Those other components are not illustrated or discussed in this description in order to more clearly describe relevant aspects of the below described example systems and methods.

The keypad or keyboard 130 (which may be used interchangeably during the discussion) receives input by direct pressing on the keys and then provides data representing the input to the processor 150. In an example, the input data can be in the form of American Standard Code for Information Interchange (ASCII) values, each value represented by a key on the keypad 130. Keyboard 130 in this example is a QWERTY keypad, but other key arrangements are contemplated. The touch surface 120 can be a touch-enabled screen (which may also be referred to as a touch screen or a touch input screen) used to receive direct input taking the form of "touches," "swipes," or "taps."

Device 100 can include any suitable combination of additional input interfaces (which may also be referred to as input medium or input media or input device), such as one or more cameras, microphones, biometric sensors, motion sensors, and the like. Technological advancements have enabled some of these input interfaces to be used in replacement of, or in combination with, passcodes for unlocking the device 100. For example, a camera can be used to authenticate a user by facial recognition. A microphone can be used to authenticate a user by voice recognition. A biometric sensor can authenticate a user by validating a fingerprint. Any one or more of these can be used in combination with the presently disclosed non-visual passcode method.

The touch surface 120, in this example, functions as both an output device (which may also be referred to as an output interface or output medium) as well as an input device (which may also be referred to as an input interface or input medium), with display circuitry controllable by the processor 150. Display circuitry, not shown here, can include transistors, cells, buffers, phosphors, LCDs, OLEDs, and the like. The touch surface 120, in one example, generates images of data and applications maintained in memory 112.

A touch surface 120 can be integrated with a flat panel display screen, as shown in FIG. 1A. Some examples of flat panel displays are a liquid crystal display (LCD), a plasma display, an organic light emitting diode (OLED) display, and others.

Device 100 maintains, in memory 112, a plurality of computer readable instructions executable by at least one processor 150. Such instructions can include, for example, an operating system and a variety of other applications. When processor 150 executes the instructions of the passcode unlock module 155, processor 150 is configured to perform various functions implemented by the computer readable instructions of the respective applications. It is contemplated that memory 112 can store a variety of additional applications, such as a calendar application, a telephony application, a web browsing application, a text messaging application, and email client application, and the like (not shown).

In general, the at least one processor 150 is configured, via the execution of instructions contained in the passcode-unlock module 155, to change the access status of the device 100 from LOCKED to UNLOCKED. The passcode-unlock module 155, when executed by the processor 150, can issue instructions to unlock the device 100. That is, for example, it can unlock use (e.g., access) of a user interface of the device. It can unlock operations of certain functions and features of the device. It can unlock all operations and features of the device. Unlocking the device 100 can allow access to and use of at least some of the device features, such as telephony functions, messaging functions and other functions of the device that will be known to a person of ordinary skill in the art. It can unlock a specific application of the device, such as, for example, a wallet or payment application. In some embodiments, the device may include multiple modes of operation such as any of the following: personal mode, enterprise mode, child mode, guest mode, work mode, school mode, etc. The passcode-unlock module may be configured to unlock the device to operate in a particular mode.

A transducer collectively refers to either one or both of sensors (input) and actuators (output). According to the present example, a transducer converts input force sensed at an outer surface of a device to an out vibration signal applied to the same outer surface. The combination of sensors 145 and the haptic feedback actuator 160 forms a transducer 145,160 that can be used to convert the input pressure force at the outer surface into output pulse signals at the same surface. The transducer 145,160 can use a vibration motor, an electro-magnetic coil, a piezo-electric motor, or other form of actuator to generate a vibratory signal at the outer surface of the device.

In some implementations, the passcode unlock module 155 also provides instructions for setting a reference passcode. The reference passcode can take the form of, for example, a variable length alphanumeric device password, a gesture-based unlock code, a biometric scan, voice-based code, image-based code, video-based code, any combination thereof, or other forms contemplated by one with ordinary skill and knowledge in the art. In general, processor 150 is configured, via the execution of passcode unlock module 155, to allow the setting of reference passcodes which are used, for example, by the passcode unlock module 155 when unlocking access to the device 100 and other modules. In some implementations, at least part of the function of the passcode unlock module 155 can be provided through hardware and/or firmware components such as encryption/decryption modules (not shown). In some implementations at least part of the function of the passcode unlock module 155 can be provided through other software applications (not shown) residing in memory 112, for example.

The passcode-secured device 100 is able to use various executable applications or other tools to allow communications with other devices. For example, the electronic device 100 is able to use applications or other tools to communicate over various communications channels, such as e-mail, BlackBerry Messaging (BBM®), messaging, social media, other communications channels, or combinations of these. These communication media allow a user to activate a user's account, such as a user's e-mail account, a user's social media feed, a user's instant messaging account, other user's accounts, or combinations of these, on one or more devices. According to the example, each device with an activated account receives all updates for that account, even if the update is sent through an activated account on another device.

The illustrated device 100 is shown to have a keyboard 130 to support user inputs, and a touch surface 120 to support visual outputs to the user. The screen 120 in some examples is able to support touch sensing to allow the screen to be used as an input device by the user's touching of the screen. In various examples, the keyboard 130, as shown in FIG. 1A, is a physical keyboard with mechanical keys, or it can be a virtual keyboard that is displayed on a portion of a screen of a display that supports touch-based inputs to allow the user to enter data by touching portions of the screen displaying particular keys. Some embodiments may have a physical keyboard or a virtual keyboard or both, while other embodiments may have no keyboard. In further examples, the device 100 is able to include further user interface facilities which are not depicted here in order to more clearly present aspects of the below-described systems and methods, directed to a non-visual method of passcode unlock using force detection and tactile feedback.

A media reader 170 is able to be connected to an auxiliary I/O device to allow, for example, loading computer readable program code of a computer program product into the device 100 for storage into memory 112. One example of a media reader 170 is an optical drive such as a CD/DVD drive, which may be used to store data to and read data from a computer readable medium or storage product such as computer readable storage media. Examples of suitable computer readable storage media include optical storage media such as a CD or DVD, magnetic media, or any other suitable data storage device. Media reader 170 is alternatively able to be connected to the electronic device through a data port or computer readable program code is alternatively able to be provided to the device 100 through a wireless network.

FIG. 2—Force-Sensing Touch Surface Components

FIG. 2 is a high-level diagram of the layered components of a force sensing touch surface 120 of the mobile electronic device 100, according to an example. The layers of the touch surface 120 include, from the outermost layer to the innermost layer: the cover glass 211, the touch sensor array 212, an LCD (liquid crystal display) screen 213, a force sensor array 214, and a haptic actuator 215. The user makes contact with the touch surface 120 by pressing down on the cover glass 211. The tactile pressure applied by the user is detected by the touch sensor array 212 beneath the cover glass 211. Another array, the force sensor array 214, is configured to measure the amount of pressure force applied to the touch surface 120. The haptic actuator 215 is configured to transmit a haptic effect (e.g., a vibratory signal) to the touch surface 120 where it is perceived by, for example, touch sensation of a user's finger that is touching the surface 120. The haptic effect will continue as long as the user (user's finger) remains in contact with the touch surface 120, or until a programmed time-out is executed.

Figure 3:
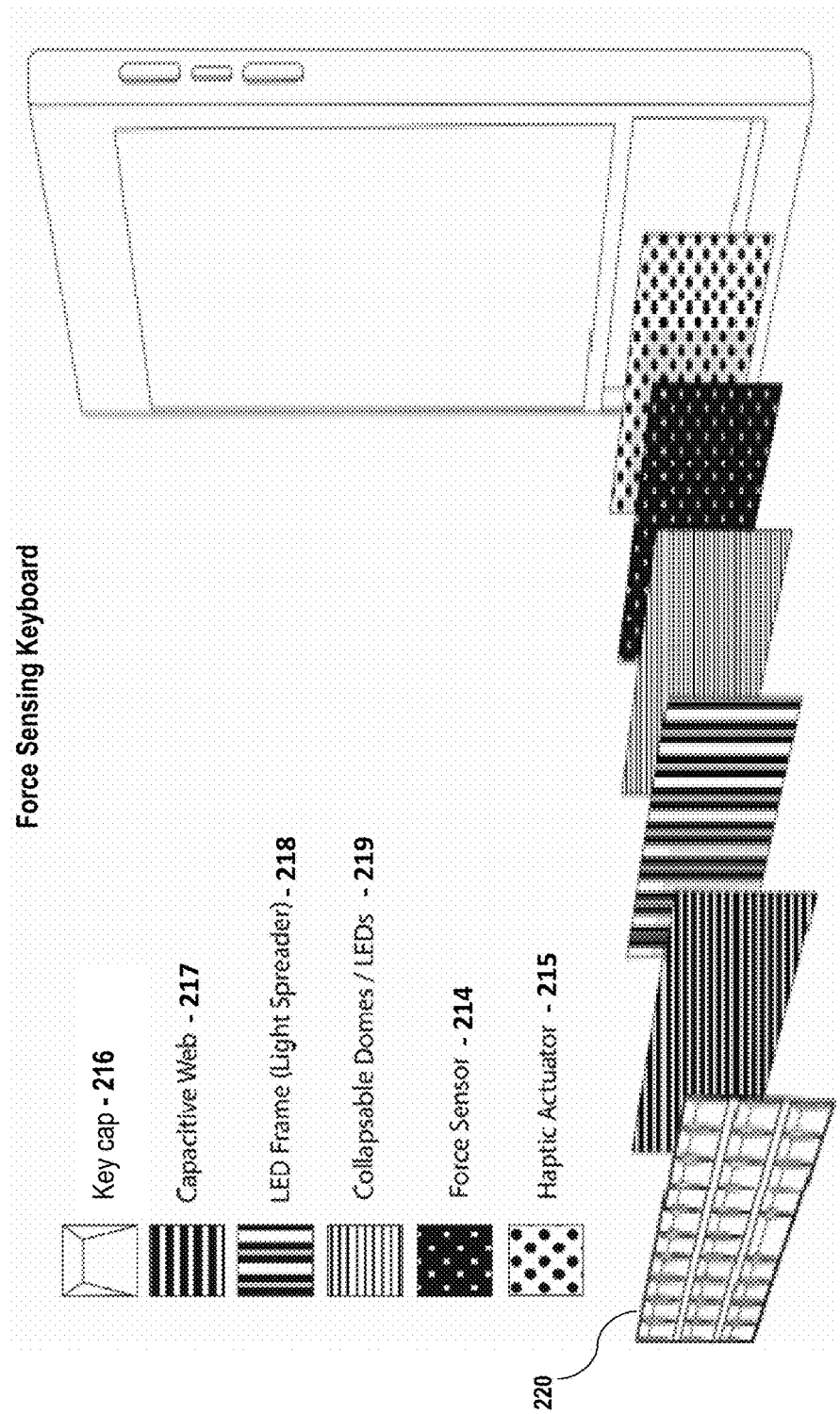
FIG. 3 illustrates component layers of a force sensing keyboard and user interface, according to an example.

FIG. 3—Force-Sensing Keyboard Components

FIG. 3 is a high-level diagram of the components of an optional force-sensing keyboard 130 of the electronic device 100 of FIG. 1A, according to one example. The components are layered within the keyboard housing as follows, from outermost layer to innermost layer: key caps 216, key mat 220, capacitive web 217, LED frame (light spreader) 218, collapsible domes/LEDs 219, a force sensor 214 and a haptic actuator 215. A hardware keyboard 130 can be configured to implement the force-sensing haptic feedback method with a minor addition of hardware to an existing keyboard. For example, a typical keyboard does not include a force sensor 214 because typically a keyboard operates in a binary fashion—the key is either pressed or not-pressed. Likewise, a typical keyboard does not include a haptic feedback actuator 160.

However, a typical virtual keyboard, such as used on a BlackBerry® mobile device or such as used on another mobile device (e.g., the iPhone® made by Apple or an Android-based mobile device made by Samsung or by other mobile device manufacturers), can include a haptic feedback transducer that merely provides a fixed tactile signal to a user as an affirmative indication (i.e., YES or NO) that the device has recognized when the user has touched a key on the virtual keyboard. However, such virtual keyboards generally do not include a pressure force sensor 214, and certainly no combination operation of a pressure force sensor 214 and the haptic feedback actuator 160.

According to various implementation of the presently disclosed example, the keyboard 130 can be enabled with the force-sensing haptic feedback activated on a specific key of the keyboard 130, on all keys of the keyboard 130, or on a portion of the keyboard 130.

Figure 4:
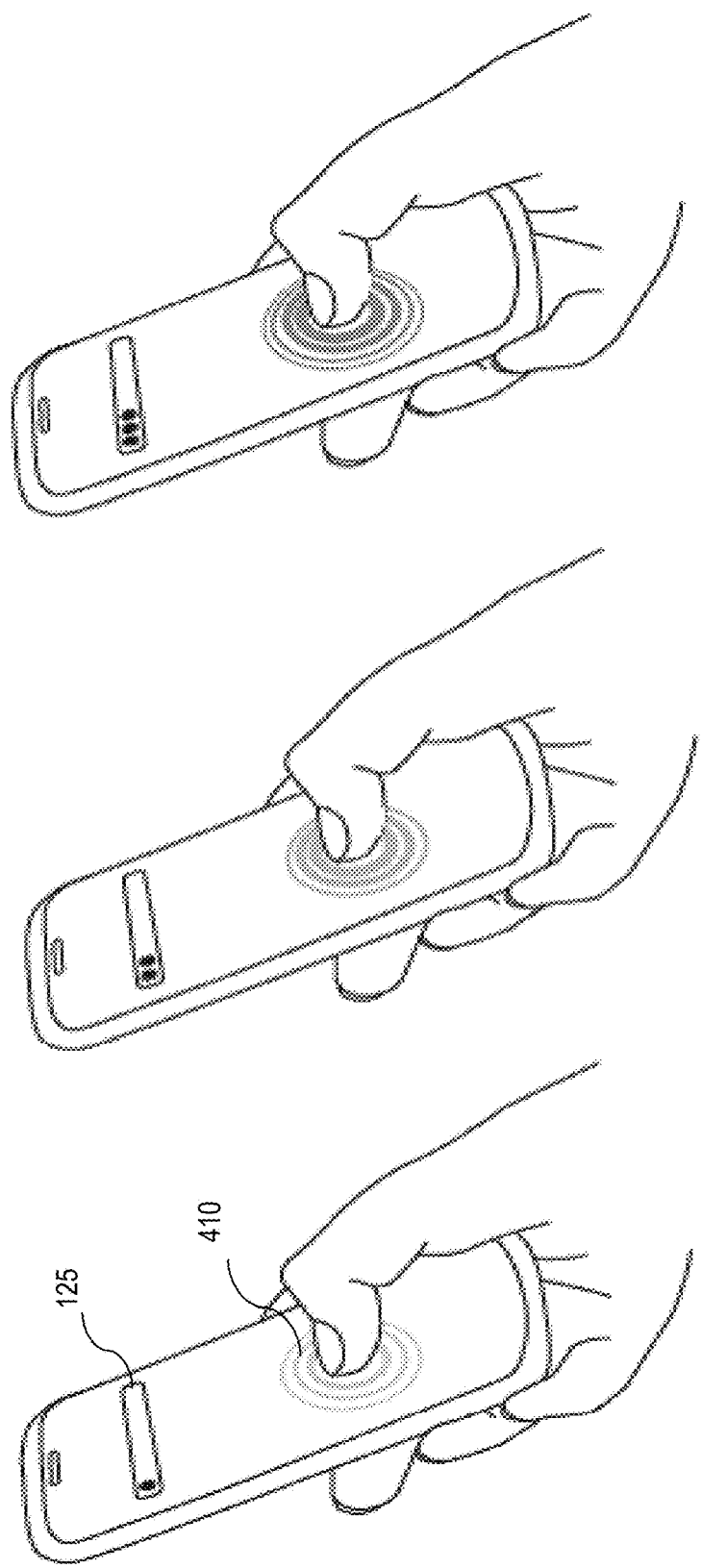
FIG. 4 illustrates a non-visual passcode unlock process using a touch display, according to an example.

FIG. 4—Touch Surface Implementation

FIG. 4 provides an example of the non-visual passcode unlock process for a touch surface of an optional touch-enabled display, according to one implementation. It should be noted that the touch surface 120 of a passcode-secured device 100 does not need to include a display; it can be any touch surface configured to process tactile input, with or without a display screen. For example, the touch surface can incorporate a fingerprint sensor. As another example, the touch surface can be a touch pad of a device.

In the example illustrated in FIG. 4, a pressure force 410 is represented as a series of concentric circles surrounding the point of contact on the touch surface. The actual point of contact may be significant, depending on the implementation. In some examples, the force sensor array 214 is substantially the same size as the cover glass 211, allowing tactile input to be perceived anywhere on the touch surface 120. In other examples, the force sensor array 214 may be localized to a certain area beneath the cover glass 211. In certain implementations where the force sensor array 214 is localized, the touch surface 120 can include a mark or symbol, or can be made to display a mark or symbol, so that the user knows where to press to apply the pressure force.

As the pressure force 410 on the touch surface 120 is increased, the rate of transmission of vibratory pulses at the touch surface is increased; while as the pressure force 410 is decreased, the rate of transmission of the pulses slows down. As a user presses down harder on the touch surface 120, he/she will receive the vibratory pulses at a more rapid rate. This feature is especially convenient when conveying a large number of pulses, such as the number nine for a passcode field. Instead of waiting until nine pulses have been transmitted at a base "slower" rate of transmission, the user can press down harder on the touch surface until six or seven pulses have been felt, then decrease the pressure force applied on the surface to slow down the rate of transmission for the last two or three pulses.

In one example as shown in FIG. 4, a window prompt 125 displays icons representing the passcode fields confirming each time a passcode field is entered. The prompt 125 can also include a notification explicitly requesting entry of the passcode, as in FIG. 1A. Further types of notifications are able to be provided by any other suitable technique, or by any combination of these. Some types of notifications are: an audible aspect such as a tone or alarm or speech message; a visual aspect such as a flashing LED or another indicator light, a popup or banner displayed on a display screen, a haptic aspect such as a vibration, or a combination thereof. Based on prompting for entry of the authorization code, the device 100 in some examples suspends at least one function or feature of the device 100 until the authorization code is entered correctly. Suspending at least one function or feature can include, for example, locking the user interface of the device 100 to prevent usage other than entry of the authorization code, preventing access to any data stored on the device 100, limiting a usage of one or more portions of the device 100, any limitation of device usability, or combinations of these. A passcode prompt, in its simplest embodiment, can be the inability to unlock the device 100, much as a non-opening door is a prompt to use a key. One with ordinary skill and knowledge in the art will recognize that many different examples of passcode prompts can be advantageously used with the non-visual passcode method.

Figure 5:
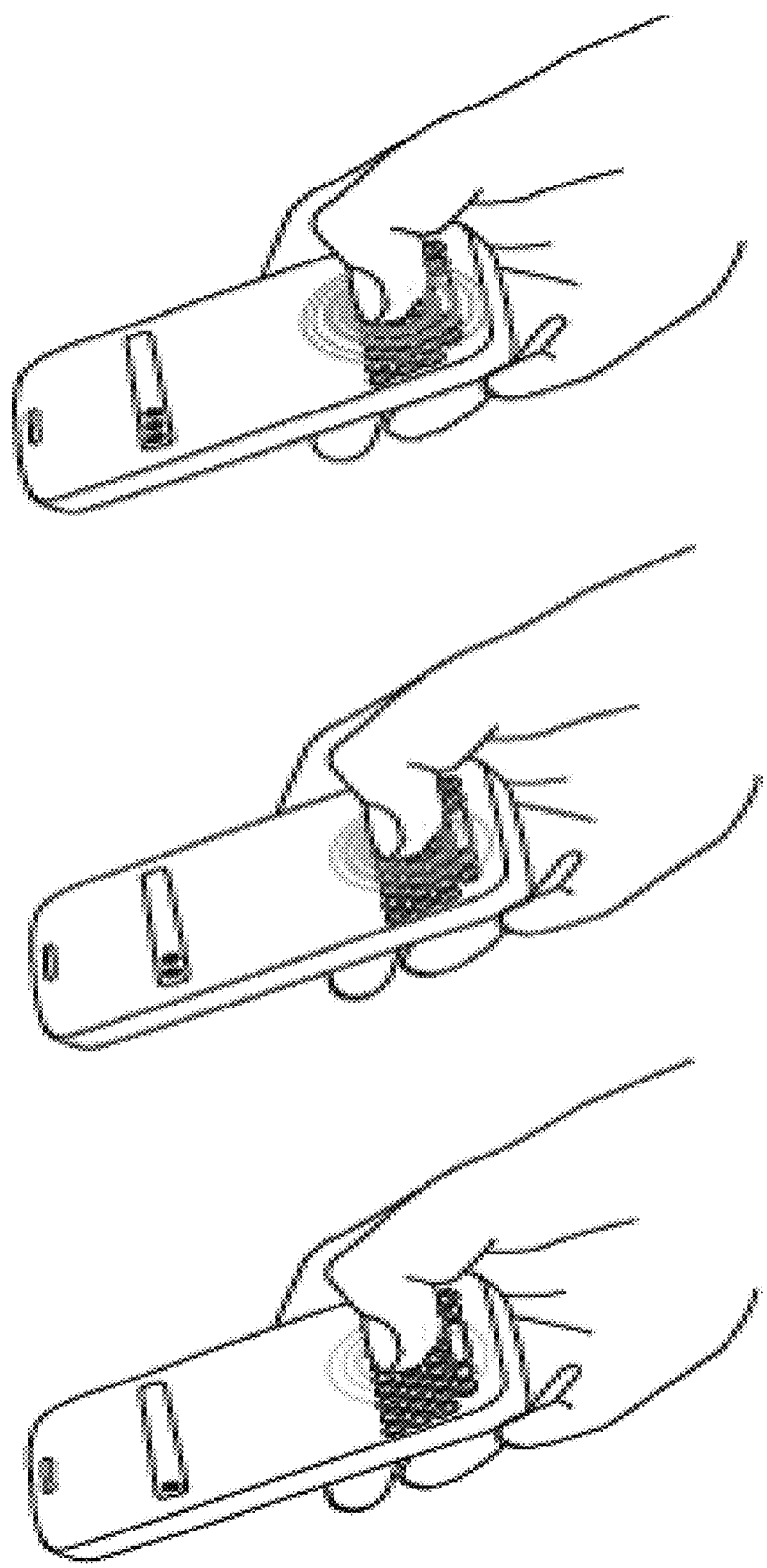
FIG. 5 illustrates a non-visual passcode unlock process using a keyboard, according to an example.

FIG. 5—Keyboard Implementation

FIG. 5 illustrates the non-visual passcode unlock process for an optional hardware keyboard 130, according to one example implementation. The keyboard 130 shown in FIG. 5 is a physical keyboard using a QWERTY layout; however the non-visual passcode unlock method can be implemented with non-QWERTY keyboards and numerical keypads as well. An implementation with a keyboard may add to the keyboard, or a portion thereof, one or more pressure sensor devices and haptic effect transducers.

In one example, a sensor array 214 is disposed underneath the keyboard 130 as well as actuators 215. The actuators 215 can be, for example, piezo-electric actuators under each key, or actuators placed in segments of the keypad. The actuators 215 can be localized to a certain section, for example, a quadrant, or the actuators 215 can be generalized to respond to force applied anywhere on the keyboard 130.

In one implementation a force detection sensor 214 is disposed underneath each key 216 to detect the level of pressure when that key is depressed. In another implementation, the force sensors 214 are arranged in an array under the key mat 220 to sense a level of pressure.

In a physical keyboard 130, according to one example, each key in the keyboard 130 includes a key cap 216 disposed over a capacitive web 217. The capacitive web 217 senses capacitance of an object (e.g., a user's finger) that is located proximate to the top surface of the key cap 216. The capacitive web 217 provides a fast detection of a user's finger proximate to, and likely selecting, a particular key. Below the key cap 216 and capacitive web 217, in certain embodiments, a light spreading frame 218 provides a backlighting feature for the key. This helps a user locate the specific key, such as under certain ambient lighting conditions.

Underneath the key cap 216, capacitive web 217, and the light spreading frame 218, is an elastic collapsible dome 219. The collapsible dome 219 can be deformed by downward force applied to the top surface of the key cap 216. This downward force pushes down on the key cap 216 and collapses (deforms the elastic dome 219 which impinges on (and contacts) the force sensor array 214 below the dome 219. The force sensor array 214, in response to the contact from the collapsible dome 219, transmits a force sensing signal to the processor 250 to indicate the amount of downward force being sensed by the force sensor array 214. The processor 250, in response to detecting a level of downward force being sensed by the force sensor array 214, sends an activation signal to the haptic actuator 215. The haptic actuator 215, in response to the activation signal, generates a haptic effect signal at the top surface of the key cap 216. This haptic effect signal may also be referred to as a "click" signal, or a vibratory signal, that can be perceived by touch sensation of a person's finger while pressing down (while applying the downward force) on the top surface of the key cap 216. This is only one example and there are many different ways that a key, or a keypad or keyboard, can be implemented on a device.

Pushing down on the key 216, collapsing the elastic dome 219, also known as "snapping the dome" is produced by known means. The "click" or "snap" of the key produces a "feel" that is transferred to the surface of the key. An audible click may also be heard. Both the audible and tactile "click" are produced in known ways, such as by employing a "clicking diaphragm" with a dome-shaped or bossed structure. A click is similar to a pulse, but may produce a feel that is more localized. The type of actuation also has an effect on the tactile sensation of the click. A piezo-electric actuation may feel differently than an electro-magnetic actuation. For example, an electro-magnetic snapping of the dome sensation would not be confused with a pulse or vibration, it would feel like a snap against the user's finger.

Some examples of this technology can be found in "Push button switch covering assembly including dome contact," U.S. Pat. No. 5,881,866 A, filed on Jan. 13, 1998; "Keyboard dome stiffener assembly," U.S. Pat. No. 8,253,052 B2, filed on Feb. 23, 2010; and "Method in the manufacture of a keyboard for an electronic device," U.S. Pat. No. 6,483,051 B2, filed on Jun. 29, 2001.

In a keyboard 130, according to the present example, pressing down on the key cap 216 will not produce a dome click unless a certain level of force is exerted. The force detection sensors 214 can sense the amount of force pressure applied. Similar to the touch surface 120 implementation discussed above, the harder one presses the keys, the faster the rate of clicks transmitted to the top surface of the keys. The user then while counting the number of clicks waits until the requisite number of clicks for the current sequential passcode field have been felt by the user. The user then removes his/her finger from the keyboard 130, and so on.

The capacitive web 217 just under each key cap 216 of each key allows fast detection/sensing of the capacitance of a person's finger as it is located in or near the vicinity of the top surface of the key cap 216. The person does not have to apply pressure to the key cap 216 to register a key selection. The person only places their finger proximate to the top surface of the key cap 216 and it is detected by the processor 150 of the device 100 which may determine that the particular key is being selected by the person. This capacitance detection/sensing measures the amount of capacitance of a person's finger/hand as it is located proximate to the outer surface.

In one example, the passcode is entered by pressing one particular key of the keyboard 130, rather than any keyboard key. In another example, a section or quadrant of the keyboard 130 could be enabled with haptic feedback and designated as pressure-sensitive. The keyboard 130 can be fitted with panels underneath the keys to cause vibration of the affected keys to communicate a vibration signal to the finger that is holding down the key. The key mat 220 is a single flexible surface, just as the sensor array 214 beneath it. This allows for pinpointing a specific pressure point to determine what key is being pressed and the actuation is happening beneath that key.

Figure 6:
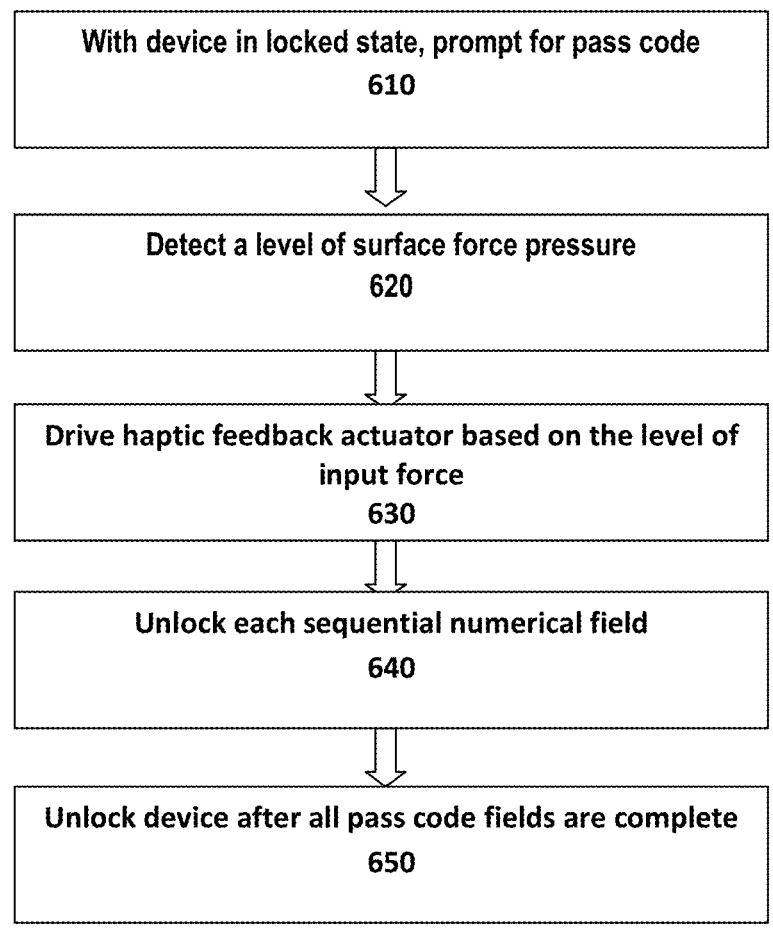
FIG. 6 is a process flow diagram illustrating a non-visual passcode unlock process, according to an example.

FIG. 6—Non-Visual Passcode Unlock Process Overview

FIG. 6 is a process flow diagram of the non-visual passcode unlock method, according to an example. The non-visual passcode unlock process begins at step 610 with a passcode-secured device 100 in a locked state, prompting for a passcode. In step 620, a level of surface force pressure is detected when the user presses a finger down on the touch surface 120 or pressure-sensitive keyboard 130 in a press and hold gesture. The level of force must be such that it is distinguishable from someone just touching the device 100. The touch pressure can be localized to one specific section or key, or it can be anywhere on the surface of the device 100.

In step 630, responsive to detecting the press and hold gesture by the sensors 145, the processor 150 drives the haptic feedback actuator 160 based on the detected level of input force. The haptic feedback actuator 160 produces a series of vibratory pulses in response to the touch pressure. Depending on the implementation, the vibratory pulses can be felt on the touch surface 120 of the device, on the keyboard 130, or on the entire device surface, including the housing 105.

In step 640, each set of pulses between force release is counted and used to unlock each sequential numerical field of the passcode in a discrete experience. In step 650, the device 100 is unlocked after all passcode fields have been successfully entered. The device (or at least a portion thereof) is now in the unlocked state. This provides a uniquely discrete non-visual experience for entering a passcode into a device. This method may be particularly useful for blind or visually impaired users.

Figure 7:
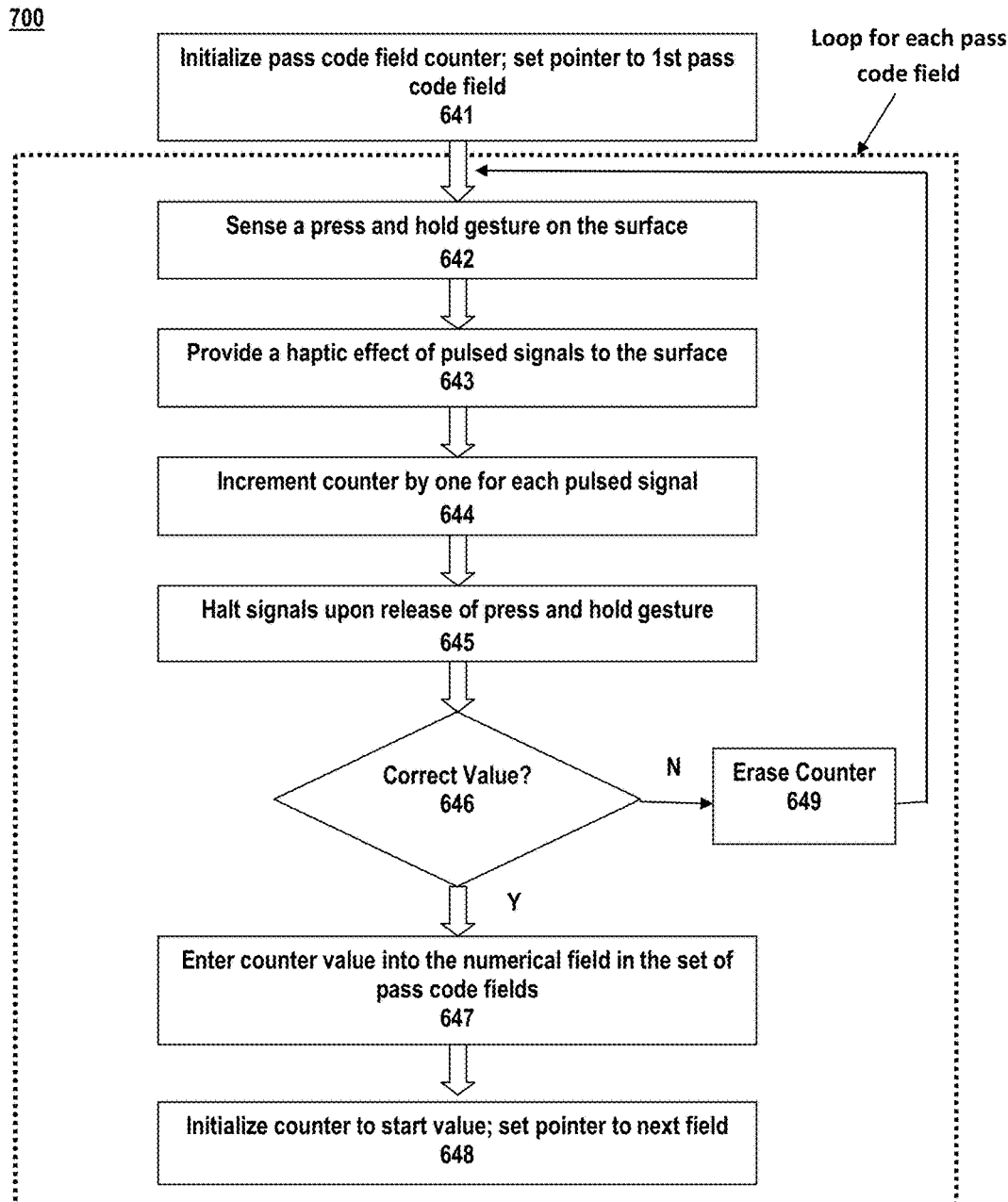
FIG. 7 is a process flow diagram illustrating a method for driving a haptic feedback actuator while in a non-visual passcode unlock process, according to an example.

FIG. 7—Haptic Feedback Process Overview

FIG. 7 is a process flow diagram of the method of driving the haptic feedback actuator 160 for unlocking each sequential numeric field, according to an example. This is a flow diagram of step 640 from FIG. 6. The process begins at step 641 by initializing the passcode field counter 184 to a base start point. In most cases this will be approximately zero. The pointer 182 is set to the first passcode field and will be moved after each field is correctly entered.

Steps 642 through 648 are performed in a loop for each passcode field. In step 642, the sensors 145 sense a press and hold gesture on the surface of the device 100. In step 643, the haptic feedback actuator 160 provides a haptic effect of pulsed signals to the surface of the device while the press and hold gesture is maintained. Note that the input signals detecting the force and the output pulse signals are occurring substantially concurrently.

In step 644 the counter 182 is incremented by one for each pulsed signal that is communicated to the touch surface 120 or keyboard 130. Note that pulsed signals are only transmitted while the force pressure remains on the device; once the pressure is released, the pulse signals stop. In step 645 the sensors 145 detect the removal of the press and hold gesture. This is communicated to the processor 150. Responsive to sensing that the press and hold gesture has been released, the processor 150 halts the actuator 160 from transmitting the pulsed signals to the surface.

Once the pulsed output signals stop, the counter value is compared with the stored passcode in decision step 646. If the counter value matches the value for the passcode field pointed to by the pointer 182, this indicates that a correct passcode digit has been entered. In that case, processing continues to step 647 where the counter value is entered into the numerical field pointed to by the pointer 182. Therefore, if four pulsed signals were transmitted before pressure was removed (the user lifted his/her finger), then the counter value is "4" and that value is input into the corresponding passcode field.

With reference now to step 648, the counter 184 is initialized to a start value (zero) and the pointer 182 is set to point to the next passcode field. The process continues until all passcode fields have been entered; for a four-digit passcode, the loop will run four times. The device 100 will only unlock (i.e., toggle from a locked state to an unlocked state) if the entered set of sequential passcode field values matches the correct reference passcode. For a passcode of "4327" the user must sequentially maintain pressure on the device 100 for a beat of four pulses, or clicks; remove pressure; then continuously apply pressure for three clicks; remove pressure; apply pressure for two clicks; remove pressure; and apply pressure for seven clicks and remove pressure.

If, however, the counter value does not match the stored passcode value in step 646, the system prompts the user to try again in step 649 and erases the counter value. The pointer 182, however, remains set to the same passcode field. The prompt for the user to try again can be any sort of audio prompt such as a beep, a visual prompt such as a red light, or a tactile prompt such as a continuous, not pulsed, vibratory signal. In some examples, the prompt to get the user to try again can simply be that no icon appears on the prompt panel 125 to indicate a correctly-entered passcode value.

Figure 8:
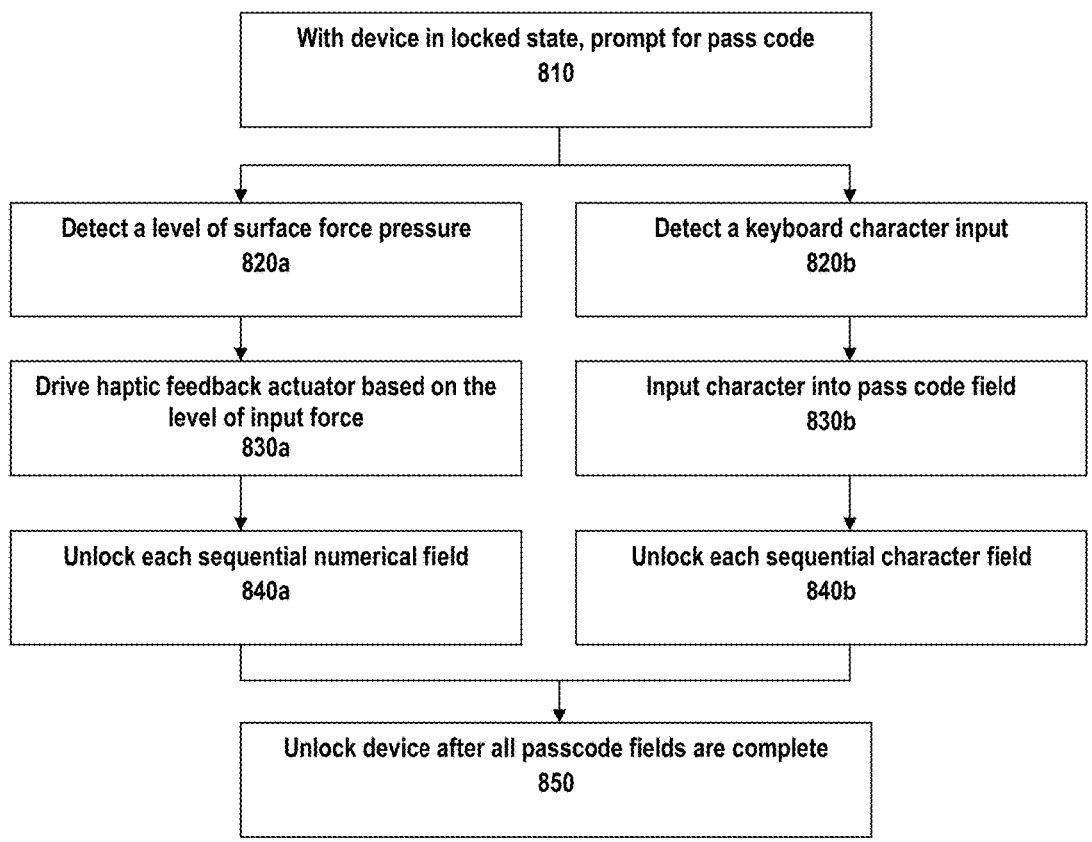
FIG. 8 is a process flow diagram illustrating a combination of a password unlock process and a non-visual passcode unlock process using surface force detection, haptic feedback, and keyboard input, according to an example.

FIG. 8—Keyboard Implementation of Passcode Unlock Process

FIG. 8 is a process flow diagram of a passcode unlock method using a combination of surface force detection and keyboard input, according to an example. The process begins at step 810 with the device 100 in a locked state, prompting for a passcode entry. In step 820a a surface force pressure on the touch surface is detected. Responsive to this force detection, in step 830a the processor 150 drives the haptic feedback actuator 160, based on the detected level of input force. In step 840a, each sequential numerical field of the passcode is unlocked responsive to the pressure application-release actions.

Steps 820b through 840b reflect the steps for entry of a keyboard character. In this implementation, the keyboard 130 does not have to be pressure-sensitive because the keyboard 130 is being used to input a character in the usual manner. These steps can be implemented either before or after entry of a numerical field via touch surface input. In step 820b input of a keyboard character is detected. Responsive to this detection, the input character is entered into the passcode field. Each sequential character field of the passcode is unlocked in this manner in step 840b. In step 850 the device 100 is unlocked after all passcode fields are complete and authenticated.

The touch surface steps 820a through 840a and the keyboard steps 820b through 840b are performed in whatever combination matches the passcode. For example if the passcode is "H2O4M2E4" the user will alternate selecting the keyboard keys for "H," "O," "M," and "E" with using the touch surface to input the numbers "2," "4," "2," and "4."

In another example requiring the use of a pressure-sensitive keyboard, a specific key or keys can be designated as input keys for the passcode. This may also enable the user to use a simple password combined with a series of clicks. The value is that even with a simple password which can be seen, the second layer of clicks is not visible to others.

Figure 9:
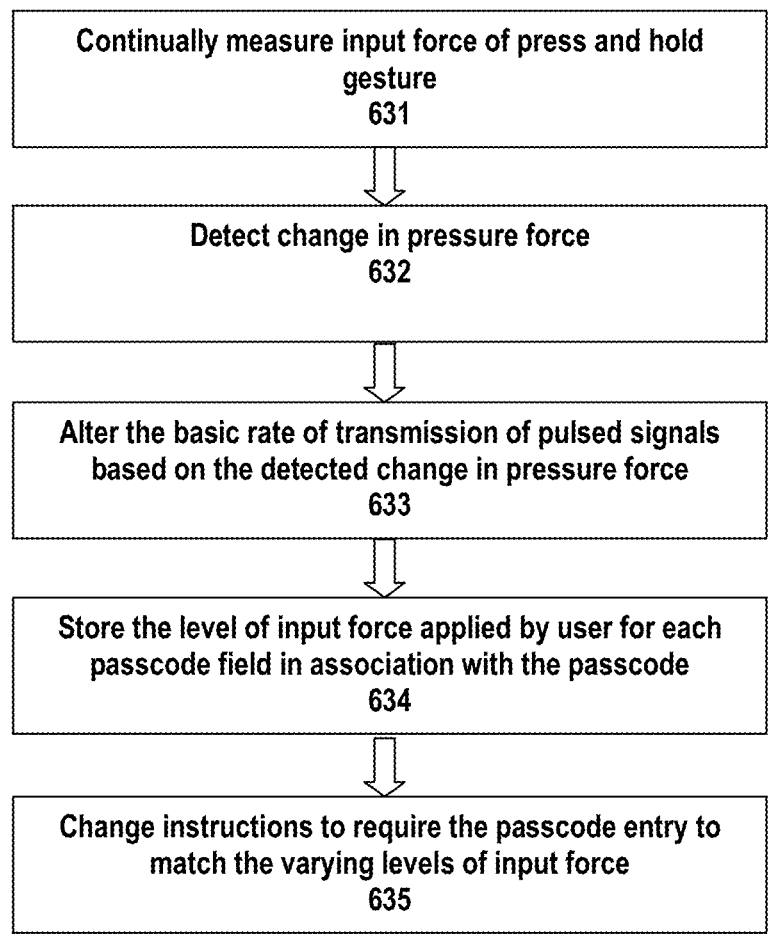
FIG. 9 is a process flow diagram illustrating a process for driving a haptic feedback actuator based on varying surface force detection, according to an example.

FIG. 9—Application of Varying Force

FIG. 9 is a process flow diagram 900 of the method for driving the haptic feedback actuator with fluctuating force, according to an example. The process flow of FIG. 9 proceeds from step 630 of FIG. 6. Beginning with step 631, the passcode-unlock subsystem 104 continually measures the input force of a press and hold gesture applied to a touch-sensitive surface, be it a panel or keyboard.

In step 632, a change in the pressure force is detected by the sensors 145. This change is communicated to the processor 150 which drives the haptic feedback actuator 160 to alter the basic rate of transmission of pulsed signals or clicks, based on the detected change in pressure force. In one example, if the pressure force increases, the rate of pulse transmission is increased; if the pressure force decreased, the rate of pulse transmission slows down. The passcode-unlock subsystem 155 stores the varying levels of input force applied by the user for each passcode field and associates the varying levels of force with each passcode in step 634. In step 635 the stored passcode is modified to include the different levels of force in association with each field. This adds an additional layer of security by associating not only the passcode characters, but the "rhythm" of input as a "signature" for that user. Rhythm (speed/time) could be built into the requirements as a security enhancement.

In one implementation, we store the varying levels of force over time until a clear pattern emerges and then that pattern is stored. The value in using force detection is that a user would be able to input a short passcode very quickly, depending on how hard they press. The passcode almost becomes a rhythm which is easy to remember and not visible to anyone. The cognitive benefit of this method is that over time users will learn the "rhythm" of their passcode which will make it even easier to remember and reduce the overload from complex passwords. Optionally, a prompt can ask the user if the input "rhythm" can be stored as a signature identifying the user.

Figure 10:
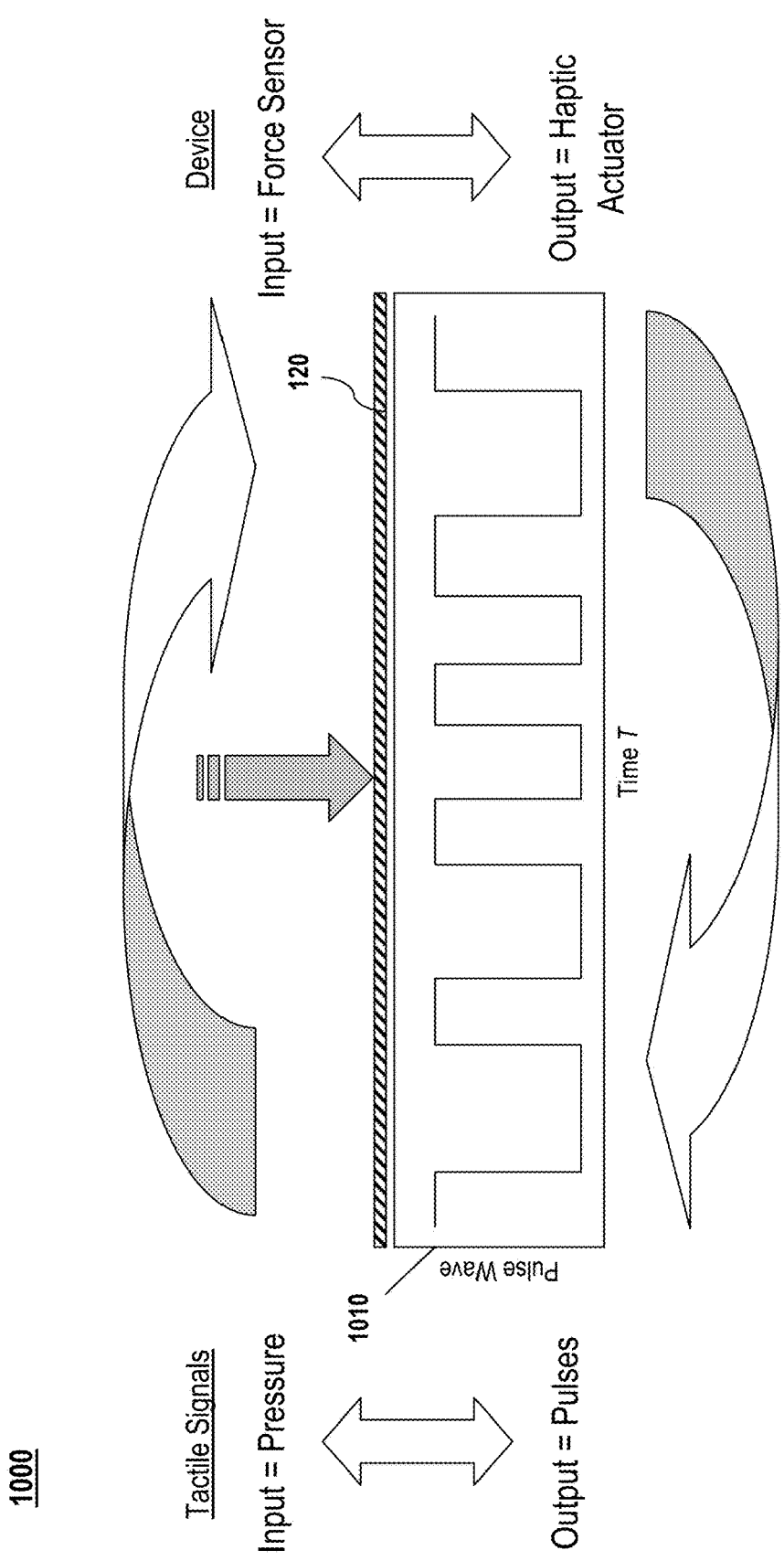
FIG. 10 is a simplified illustration of a pulse wave, or pulse train, being driven as a haptic feedback signal based on surface force-detection while in an operational loop, according to an example.

FIG. 10—Feedback Loop

FIG. 10 is a simplified illustration of the force-detection—haptic feedback loop 1000 featuring a pulse wave 1010, or pulse train, according to an example. The pulse wave 1010 shown in FIG. 10 fluctuates in response to changes in pressure applied to the touch surface 120 or touch-sensitive keyboard of the device 100. The time T between pulses becomes shorter as pressure increases, then lengthens again as pressure is eased. As the pressure increases the vibratory cycle shortens or the other way around until you reach a certain level that removes all pressure or you reach maximum pressure.

The feedback loop 1000 receives as input force pressure applied to the touch surface 120 and outputs a pulse wave 1010 or pulse train while that force is in effect. In the keyboard embodiment the output is detected as clicks. In one example, the feedback loop 1000 is enabled by a transducer combining force sensors 145 detecting the input pressure and a haptic feedback actuator 160 triggering the pulse wave 1010, or clicks.

The processor 150 drives an output port timing the pulse train 1010 that is driving the transducer and it corresponds to the level of the pressure sensors 145 that is being read or sensed back by the processor 150. Both the input pressure force and the output pulses or clicks are sensed on the same surface 120, at substantially the same time.

Figure 11:
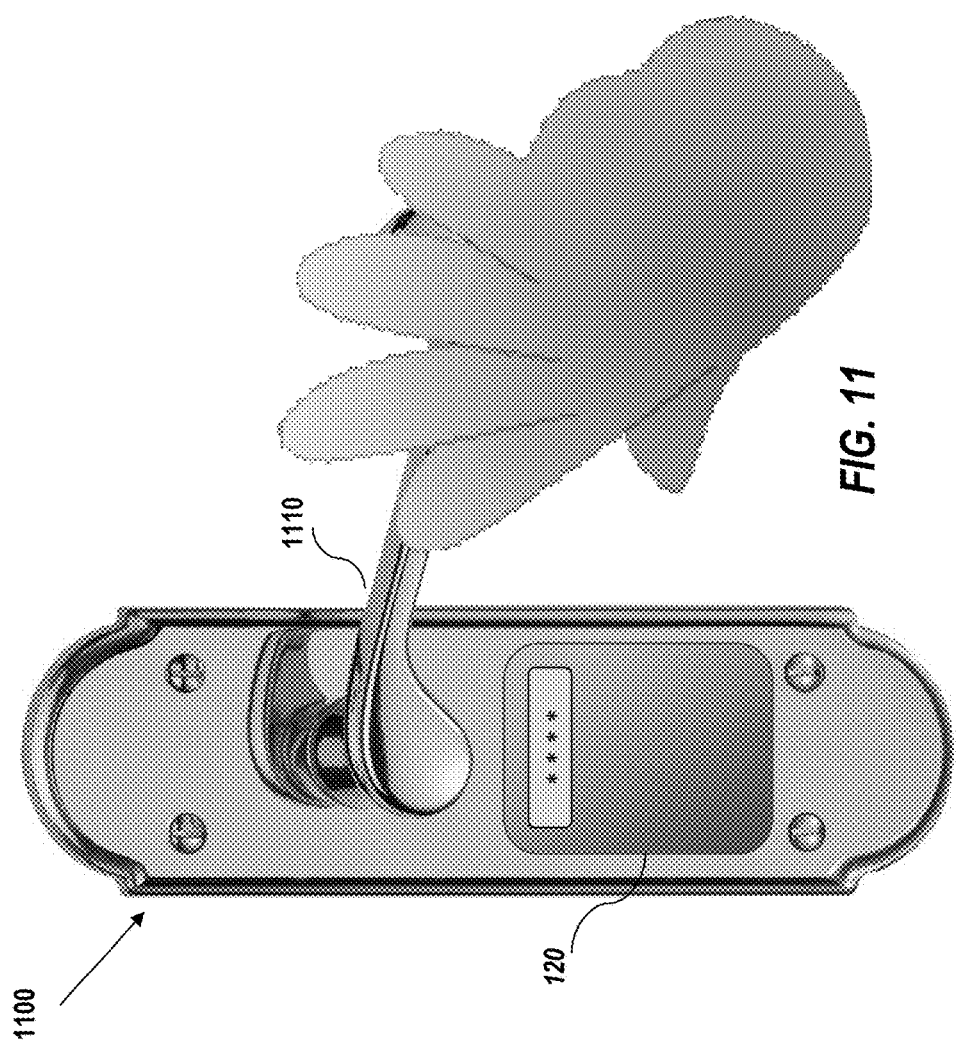
FIG. 11 is a passcode-secured door lock, according to an example.

FIG. 11—Passcode-Secured Door Lock Implementation

FIG. 11 illustrates one possible implementation of the non-visual passcode method, according to an example. A passcode-secured door lock 1100 features a touch surface 120 incorporated into the door lock mechanism. A pre-programmed passcode must be provided in order to engage the locking mechanism to unlock the door and gain physical access to a building, room, home, office, vehicle, or other secured space. A user can enter a passcode by applying pressure on the touch surface 120 using the non-visual passcode method to engage the locking mechanism. Once the passcode is successfully entered, the door lock 1100 is unlocked to open the door. The passcode can be entered by the user's thumb as the user holds the door handle 1110.

Example Information Processing System

The present subject matter can be realized in hardware or a combination of hardware and software. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method comprising:
providing, with an electronic device, a prompt requesting entry of a passcode having a reference set of sequential numerical fields stored in memory in the electronic device, a successful entry of the passcode toggling a user interface of the electronic device from a locked state to an unlocked state;
sequentially unlocking one at a time each sequential numerical field in the reference set of sequential numerical fields of the passcode by performing the following with a processor in the electronic device:
   selecting each sequential numerical field in the reference set of sequential numerical fields;
   detecting a level of external input pressure force imparted onto a touch location on an outer surface of the electronic device, in which the detected level of external input pressure force is detected as a press and hold gesture on the outer surface;
   driving, with the processor and based on the detected level of input pressure force, a haptic feedback actuator mechanically coupled to the outer surface to communicate outwardly from the touch location a series of pulsed vibratory signals;
   advancing a counter from a start value by one for each pulsed vibratory signal in the series of pulsed vibratory signals that is communicated outwardly from the touch location;
   halting the communicating of the series of pulsed vibratory signals to the touch location on the outer surface in response to sensing the press and hold gesture is released;
   comparing, in response to sensing the press and hold gesture is released, a numerical value of the counter with a numerical value of the currently selected sequential numerical field in the reference set of sequential numerical fields; and
   if the numerical value of the counter matches the numerical value of the currently selected sequential numerical field then selecting a subsequent sequential numerical field in the reference set of sequential numerical fields, initializing the counter to the start value, and repeating the above steps for each subsequent sequential numerical field, until the numerical value of each and every subsequent sequential numerical field has been compared with, and matches, a respective numerical value of the counter; and
sending an unlock signal to toggle the user interface of the electronic device from a locked state to an unlocked state in response to the numerical value of each and every subsequent sequential numerical field having been compared with, and matching, a respective numerical value of the counter; and
wherein providing a haptic effect comprises providing a set of pulsed vibration signals, each pulsed vibration signal comprising a pulsed vibration cycle of a pulsed vibration signal immediately followed by no vibration signal; and
wherein the pulsed vibration cycle has a cycle duration that varies based on detecting a varying level of input pressure force imparted onto the touch location on the outer surface of the electronic device.

2. The method of claim 1 further comprising:
measuring an input pressure force of the press and hold gesture; and altering a rate of communicating the series of pulsed vibratory signals based on detecting a change in a level of input pressure force imparted at the outer surface of the electronic device.

3. The method of claim 2 wherein altering the rate of communicating comprises:
increasing a speed of communicating the series of pulsed vibratory signals when the detected level of input pressure force is increased; and
decreasing a speed of communicating the series of pulsed vibratory signals when the detected level of input pressure force is decreased.

4. The method of claim 1 wherein the outer surface of the device comprises a keyboard and the touch location is on a key of the keyboard.

5. The method of claim 4 further comprising receiving a key input value of at least one keyboard character in combination with the entering of the numerical value of the counter into a numerical field of the set of sequential numerical fields of the passcode being entered to unlock the user interface.

6. The method of claim 2 further comprising:
storing the input force pressure applied for each of the set numerical fields of the passcode;
detecting, with the electronic device, a pattern of time and rhythm in application of the input pressure force onto the touch location on the outer surface of the electronic device; and storing the detected pattern in association with the correct passcode to provide an additional layer of security such that entry of the passcode must match the stored pattern of time and rhythm.

7. The method of claim 1 wherein the outer surface of the electronic device comprises a touch screen display and the touch location is a location on the touch screen display.

8. An electronic device, comprising:
a user interface requiring a passcode to unlock;
a memory;
a counter;
one or more sensors for detecting a level of external input pressure force imparted onto a touch location on an outer surface of the electronic device; and
a processor device configured to perform the following operations:
providing a prompt requesting entry of a passcode having a reference set of sequential numerical fields stored in the memory, a successful entry of the passcode toggling the user interface of the electronic device from a locked state to an unlocked state;
sequentially unlocking one at a time each sequential numerical field in the reference set of sequential numerical fields of the passcode by performing the following:
selecting each sequential numerical field in the reference set of sequential numerical fields;
detecting a level of external input pressure force imparted onto a touch location on an outer surface of the electronic device, in which the detected level of external input pressure force is detected as a press and hold gesture on the outer surface;
driving, with the processor and based on the detected level of input pressure force, a haptic feedback actuator mechanically coupled to the outer surface to communicate outwardly from the touch location a series of pulsed vibratory signals;

advancing the counter from a start value by one for each pulsed vibratory signal in the series of pulsed vibratory signals that is communicated outwardly from the touch location;
halting the communicating of the series of pulsed vibratory signals to the touch location on the outer surface in response to sensing the press and hold gesture is released;
comparing, in response to sensing the press and hold gesture is released, a numerical value of the counter with a numerical value of the currently selected sequential numerical field in the reference set of sequential numerical fields; and
if the numerical value of the counter matches the numerical value of the currently selected sequential numerical field then selecting a subsequent sequential numerical field in the reference set of sequential numerical fields, initializing the counter to the start value, and repeating the above steps for each subsequent sequential numerical field, until the numerical value of each and every subsequent sequential numerical field has been compared with, and matches, a respective numerical value of the counter; and
sending an unlock signal to toggle the user interface of the electronic device from a locked state to an unlocked state in response to the numerical value of each and every subsequent sequential numerical field having been compared with, and matching, a respective numerical value of the counter; and
wherein providing a haptic effect comprises providing a set of pulsed vibration signals, each pulsed vibration signal comprising a pulsed vibration cycle of a pulsed vibration signal immediately followed by no vibration signal; and
wherein the pulsed vibration cycle has a cycle duration that varies based on detecting a varying level of input pressure force imparted onto the touch location on the outer surface of the electronic device.

9. The electronic device of claim 8, wherein the processor further performs:
measuring an input pressure force of the press and hold gesture; and
altering a rate of communicating the series of pulsed vibratory signals based on detecting a change in a level of input pressure force imparted at the outer surface of the electronic device.

10. The electronic device of claim 9 wherein altering the rate of communicating comprises:
increasing a speed of communicating the series of pulsed vibratory signals when the detected level of input pressure force is increased; and
decreasing a speed of communicating the series of pulsed vibratory signals when the detected level of input pressure force is decreased.

11. The electronic device of claim 9 wherein the processor device further performs:
storing the input force pressure applied for each of the set numerical fields of the passcode;
detecting, with the electronic device, a pattern of time and rhythm in application of the input pressure force onto the touch location on the outer surface of the electronic device; and
storing the detected pattern in association with the correct passcode to provide an additional layer of security such that entry of the passcode must match the stored pattern of time and rhythm.

12. The electronic device of claim 8, wherein the surface of the device comprises a keyboard and the touch location is on a key of the keyboard.

13. The electronic device of claim 12 wherein the processor device further performs:
receiving a key input value of at least one keyboard character in combination with the entering of the numerical value of the counter into a numerical field of the set of sequential numerical fields of the passcode being entered to unlock the user interface.

14. The electronic device of claim 8, wherein the outer surface of the electronic device comprises a touch screen display and the touch location is a location on the touch screen display.

15. A non-transitory computer readable storage medium having computer readable program code embodied therewith, the computer readable program code comprising instructions which, responsive to being executed by a processor in an electronic device, cause the processor to perform operations including:
providing, with the electronic device, a prompt requesting entry of a passcode having a reference set of sequential numerical fields stored in memory in the electronic device, a successful entry of the passcode toggling a user interface of the electronic device from a locked state to an unlocked state;
sequentially unlocking one at a time each sequential numerical field in the reference set of sequential numerical fields of the passcode by performing the following with the processor in the electronic device:
selecting each sequential numerical field in the reference set of sequential numerical fields;
detecting a level of external input pressure force imparted onto a touch location on an outer surface of the electronic device, in which the detected level of external input pressure force is detected as a press and hold gesture on the outer surface;
driving, with the processor and based on the detected level of input pressure force, a haptic feedback actuator mechanically coupled to the outer surface to communicate outwardly from the touch location a series of pulsed vibratory signals;
advancing a counter from a start value by one for each pulsed vibratory signal in the series of pulsed vibratory signals that is communicated outwardly from the touch location;
halting the communicating of the series of pulsed vibratory signals to the touch location on the outer surface in response to sensing the press and hold gesture is released;
comparing, in response to sensing the press and hold gesture is released, a numerical value of the counter with a numerical value of the currently selected sequential numerical field in the reference set of sequential numerical fields; and
if the numerical value of the counter matches the numerical value of the currently selected sequential numerical field then selecting a subsequent sequential numerical field in the reference set of sequential numerical fields, initializing the counter to the start value, and repeating the above steps for each subsequent sequential numerical field, until the numerical value of each and every subsequent sequential numerical field has been compared with, and matches, a respective numerical value of the counter; and
sending an unlock signal to toggle the user interface of the electronic device from a locked state to an unlocked state in response to the numerical value of each and every subsequent sequential numerical field having been compared with, and matching, a respective numerical value of the counter; and
wherein providing a haptic effect comprises providing a set of pulsed vibration signals, each pulsed vibration signal comprising a pulsed vibration cycle of a pulsed vibration signal immediately followed by no vibration signal; and
wherein the pulsed vibration cycle has a cycle duration that varies based on detecting a varying level of input pressure force imparted onto the touch location on the outer surface of the electronic device.

16. The computer readable storage medium of claim 15, wherein the operations further comprise:
measuring an input pressure force of the press and hold gesture; and
altering a rate of communicating the series of pulsed vibratory signals based on detecting a change in a level of input pressure force imparted at the outer surface of the electronic device.

* * * * *